INVENTOR.
JAMES S. HETHERINGTON
BY
*Leon F. Herbert*
ATTORNEY

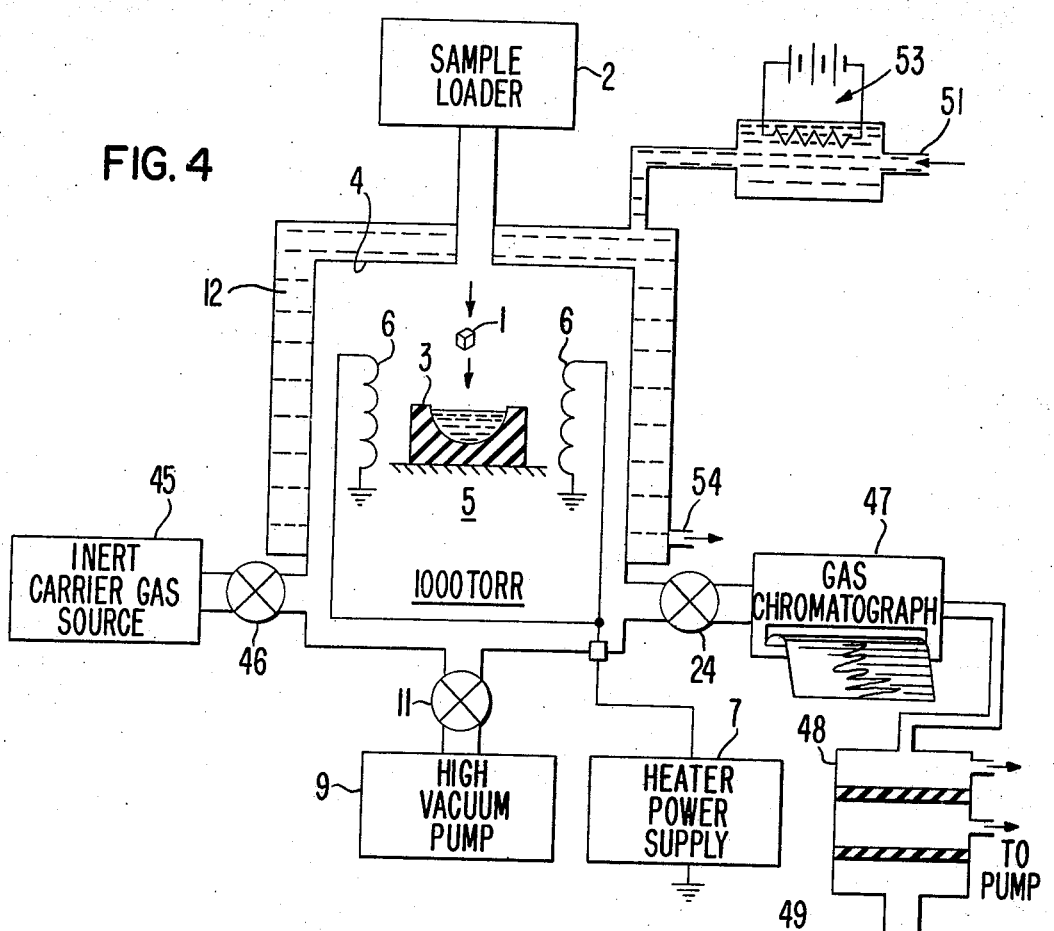
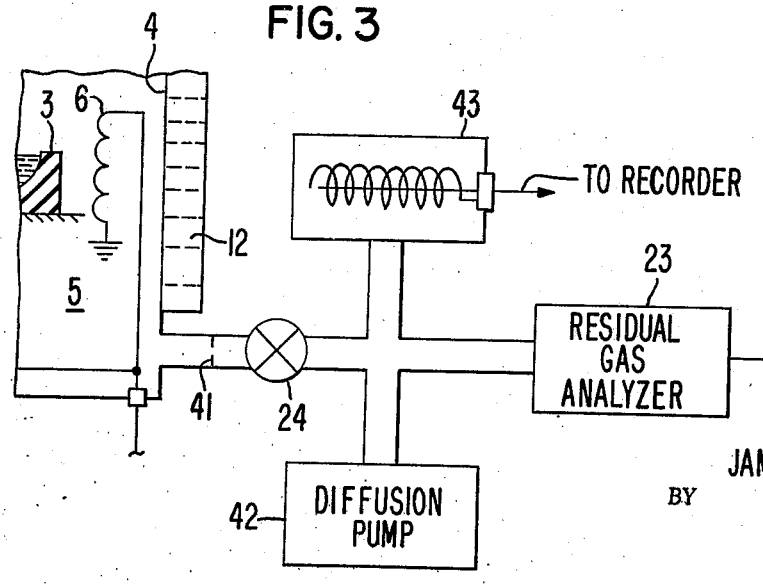

United States Patent Office 3,498,105
Patented Mar. 3, 1970

3,498,105
VACUUM FUSION ANALYZER EMPLOYING A HOT FUSION CHAMBER WALL TO PREVENT ADSORPTION EFFECTS
James S. Hetherington, Menlo Park, Calif., assignor to Varian Associates, Palo Alto, Calif., a corporation of California
Filed Mar. 8, 1967, Ser. No. 621,582
Int. Cl. G01n 7/14
U.S. Cl. 73—19                                         10 Claims

ABSTRACT OF THE DISCLOSURE

A vacuum fusion analyzer is disclosed for monitoring the types and amounts of gases adsorbed on and dissolved in metals. The analyzer includes a fusion chamber which is evacuated to on the order of $10^{-8}$ torr and thoroughly outgassed. A heated carbon crucible is contained within the fusion chamber. A sample loading apparatus drops a small cube, as of 1 to 5 grams, of the sample metal to be analyzed into the heated crucible for melting thereof. The gases which are evolved from the sample are measured both qualitatively and quantitatively to yield both the type and amount of the various type gases evolved from the sample. The walls of the fusion chamber are temperature regulated such as to fall within the range of 55° C. to 250° C. such that gases evolved from the sample are not adsorbed on the walls of the fusion chamber. Such adsorbed gases can interfere with obtaining a correct total quantitative measurement of the evolved gas and can also mask attempts to separate surface gases from internal dissolved gases. In a preferred embodiment, the chamber wall is regulated to 100° C. by a boiling water coolant jacket.

---

In another embodiment, the sample is dropped into a molten pool of the same material as the sample, as into a molten pool of a metal that will dissolve the sample (such as platinum). As the gases are evolved from the sample, they are pumped from the chamber and measured both quantitatively and qualitatively. Since the surface gases are evolved before the internally dissolved gases begin to evolve, accurate measurements of amount and type of both the surface and internal gases are obtained. The rate at which the gas is being evolved is measured and integrated to give the total amounts of gas evolved. The rate at which the gas is evolved is measured, in one case, by a Penning type pump, having cooled cathodes and, in a second case, by an ion pressure gauge and a known constriction in the line to the pump.

In another embodiment, the evolved gas is captured and then mixed with an inert carrier gas at atmospheric pressure. The mixture is then analyzed both quantitatively and qualitatively by a gas chromatograph and preferably also a mass spectrometer.

Description of the prior art

Heretofore, vacuum fusion type analyzers have been employed for determining the amounts and types of gases contained within metals. Such devices have employed an evacuated fusion chamber with a heated crucible of molten metal into which is dropped a sample to be analyzed. The evolved gases are captured and measured both quantitatively and qualitatively. However, in the prior art analyzers, the walls of the fusion chamber were water cooled to 30° C. or below. Under these circumstances, a substantial amount of the evolved gases are adsorbed onto the walls of the fusion chamber. These adsorbed gases contribute an error to the measurement of the total amount of evolved gas and prevent an accurate separation of the surface gases versus internally dissolved gasses. As a result, such measurements were very inaccurate and varied from laboratory to laboratory, due largely to different surface handling, by as much as several hundred percent in the 10's to 100's parts per million range. Below 5 parts per million, the measurements were meaningless. Moreover, the base pressures of the prior fusion chambers were established by diffusion pumps to $10^{-5}$ to $10^{-6}$ torr. Such relatively high base pressures produced an excessively large gas background which prevents precise measurements of evolved gases.

Summary of the present invention

The principal object of the present invention is the provision of an improved vacuum fusion analyzer for measuring gases dissolved in metals and/or adsorbed on metals.

One feature of the present invention is the provision, in a vacuum fusion analyzer, of a temperature regulated fusion chamber wall which operates, in use, within the range of 50° C. to 250° C., whereby adsorption of evolved gases is reduced and overheating prevented.

Another feature of the present invention is the same as the preceding feature wherein the chamber wall is operated at 100° C. by means of a boiling water cooling jacket and condenser, whereby the cooling water may be reused in a convenient manner.

Another feature of the present invention is the same as any one or more of the preceding features including apparatus for removing the evolved gas as it is being evolved and for measuring the rate at which the gas is evolving, whereby the rate measurement may be integrated to obtain quantitative measurements of the evolved gases and whereby surface gases may be separated from dissolved gases.

Another feature of the present invention is the same as the immediately preceding feature wherein the apparatus for measuring the rate at which the gas is being evolved is a measure of current drawn by a cold-cathode Penning pump connected to the fusion chamber and employing fluid cooling means for cooling its cathode electrodes, whereby gases are not evolved from the pump to interfere with accurate measurements.

Another feature of the present invention is the same as the third feature wherein the apparatus for measuring the rate at which gas is being evolved includes an ionization gauge for measuring pressure drop through a known constriction in the line through which the fusion chamber is being evacuated.

Another feature of the present invention is the same as the first feature wherein the evolved gases are mixed in the fusion chamber with a permanent carrier gas at atmospheric pressure and fed to a gas chromatograph for analysis and measurement.

Another feature of the present invention is the same as the first feature including the provision of a spectrometer for analyzing the gases being evolved as they are evolving and for recording the mass spectrum information such that it can be correlated with the rate at which gas is being evolved at the time it is being evolved, whereby the amounts of the various different gases which are evolved may be ascertained.

Other features and advantages of the present invention will become apparent upon a perusal of the following specification taken in connection with the accompanying drawings wherein:

Brief description of the drawings

FIG. 3 is a schematic diagram of an alternative embodiment of a certain portion of the structure of FIG. 1 delineated by line 3—3, and FIG. 4 is a schematic line diagram, partly in block diagram form, depicting an alternative embodiment of the analyzer of the present invention.

Description of the preferred embodiments

Figure 1:
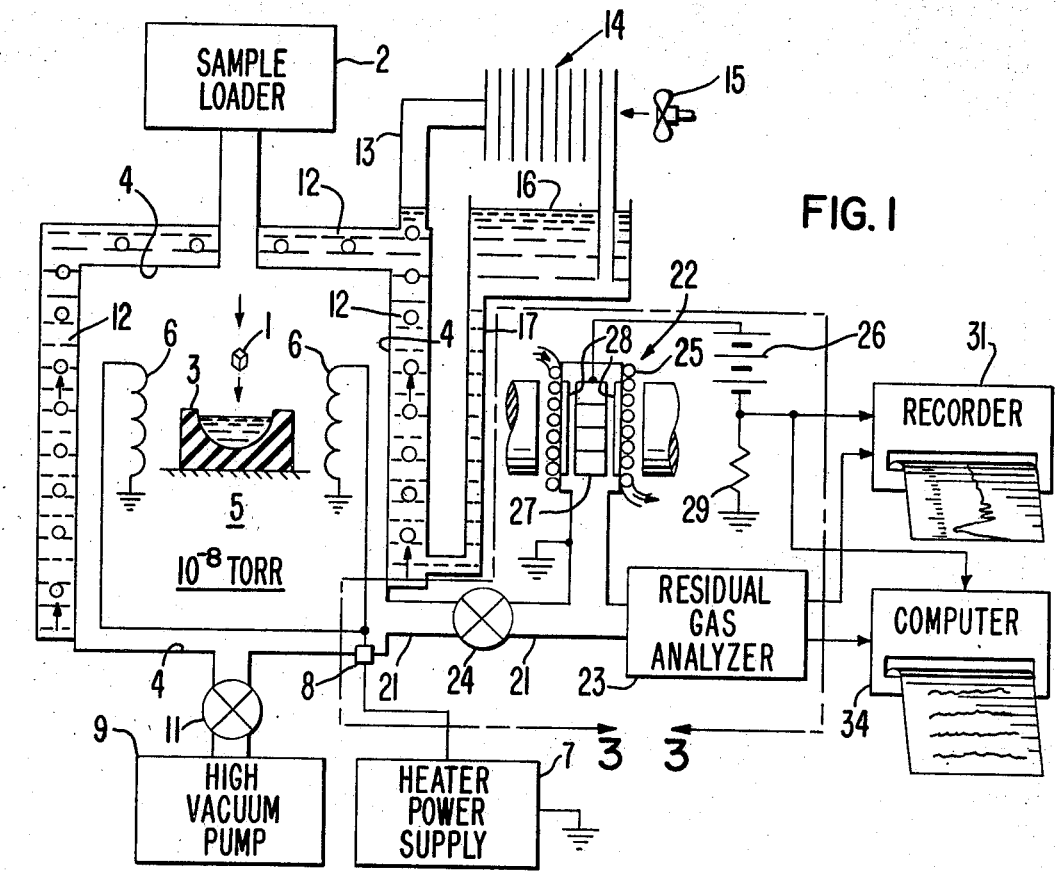
FIG. 1 is a schematic line diagram, partly in block diagram form, of a preferred vacuum fusion analyzer of the present invention.

Referring now to FIG. 1, there is shown the vacuum fusion analyzer of the present invention. A sample 1 of metal to be analyzed as, for example, a 1 to 5 gram cube is dropped from an evacuated sample loader 2 into a carbon crucible 3. The crucible preferably contains a molten outgassed pool of liquid metal of the same type as the sample under analysis or of a metal that will dissolve the sample.

The crucible 3 is contained within an evacuable envelope 4, as of stainless steel, which defines the walls of a vacuum fusion chamber 5. Heating elements or induction coil 6 are disposed around the crucible 3 for heating the crucible and its contents to operating temperatures within the range from 900° C. to 2800° C. In case a copper sample is being analyzed, the crucible contains about 25 grams of molten copper at 1100° C. into which is plunged the 5 gram sample 1 to be analyzed. The heating elements 6 may be of the inductive or radiative type and are supplied with power from a heater power supply 7 through a suitable feed-through insulator assembly 8.

A high vacuum pump 9, preferably of the getter-ion type such as a 140 liter/second Vac Ion pump, is connected to the fusion chamber 5 via valve 11. The high vacuum pump 9 is employed to pump the chamber 5 down to a base of $10^{-8}$ torr for about 12 hours while the chamber 5 is heated to thoroughly outgas the molten liquid pool and chamber surfaces. After the chamber 5 is outgassed, the valve 11 is closed and the chamber is ready to receive the sample 1.

A liquid coolant jacket 12 surrounds the fusion chamber 5 for dissipating the heat from the heating elements 6, which heat is transmitted to the walls 4 of the fusion chamber 5. The jacket 12 is filled with water at atmospheric pressure. Heat conducted to the water causes boiling and evaporation of the water. The steam is piped off via pipe 13 to a condenser 14 wherein it is cooled by air blown by a blower 15 over cooling fins on the condenser 14. The water condensed from the steam is returned to the coolant jacket 12 via reservoir 16 and return pipe 17. Thus, the boiling water type cooling jacket 12 is self regulating as regards the temperature of the chamber defining walls 4 of the fusion chamber since the water boils at 100° C. and will keep the walls 4 at essentially that temperature. Operation of the fusion chamber walls 4 at a temperature falling within the range of 50° C. to 250° C. is desired since temperatures above 50° C. prevent any substantial adsorption of gas and temperatures below 250° C. are desired to prevent outgassing and damage to various parts of the chamber 5.

As the gases are evolved from the sample 1, they are fed via exhaust tubulation 21 to a second getter-ion pump 22 and a residual gas analyzer or mass spectrometer 23. A high vacuum valve 24 is placed in the exhaust tubulation to permit the pump 22 and residual gas analyzer to be valved-off from the fusion chamber 5 and to be continuously evacuated by the pump 22. In this manner, gasses are not entrapped in the vacuum pump 22 and residual gas analyzer 23 to be later re-evolved destroying the accuracy of the system, nor are they contaminated by outgassing of the fusion chamber and vacuum pump 9 during pumpout periods.

The second vacuum pump 22 is preferably of the multiple cell Penning cold-cathode glow discharge type, either of the diode or triode configuration. However, in a preferred embodiment, the cold-cathode structure is liquid cooled by means of coolant pipes 25 disposed in heat exchanging relation with the cathode 28 and/or target electrodes within the pump to prevent overheating and outgassing in use. A suitable vacuum pump 22 is an 8 liter per second or 15 liter/sec Vac Ion pump marketed by Varian Associates of Palo Alto, Calif.

Power is supplied to the pump 22 from a battery 26 or low-noise DC supply producing 3000 volts output which is applied between the anode 27 and the cathode 28 of the pump 22. The current drawn by the pump 22 is fed through a current measuring resistor 29. The voltage developed across the low resistance current measuring resistor 29 is fed to one input channel of a strip chart recorder 31 and recorded versus time, as shown by curve 32 of FIG. 2.

The ion pump 22 is in gas communication with the fusion chamber 5 through tubulation 21 and valve 24 when the sample 1 is being melted. The current drawn by the pump 22 is approximately proportional to the rate at which gas is being evolved from the sample 1. More specifically, the current quantity recorded is proportional to torr-liters per coulomb. Thus, the area under the curve 32 is proportional to the quantity of gas pumped which is substantially all the gas evolved from the sample 1.

The residual gas analyzer 23 is a quadrupole electrostatic mass spectrometer having a spectrum scan speed of two spectra per second. The mass spectrum output of the gas analyzer 23 is fed to a second channel of the recorder 31 wherein it is recorded on the same time base, as of 2″ per second, as the output of the ion pump 22, as shown by curve 33 of FIG. 2. In addition, the current output of the pump 22 and the mass spectrum output can be fed to a computer 34 wherein the computer 34 automatically performs appropriate calculations and prints out the amounts and types of gases evolved from the sample at various times and the total amount of the various gases evolved. Otherwise this function is performed manually.

Figure 2:
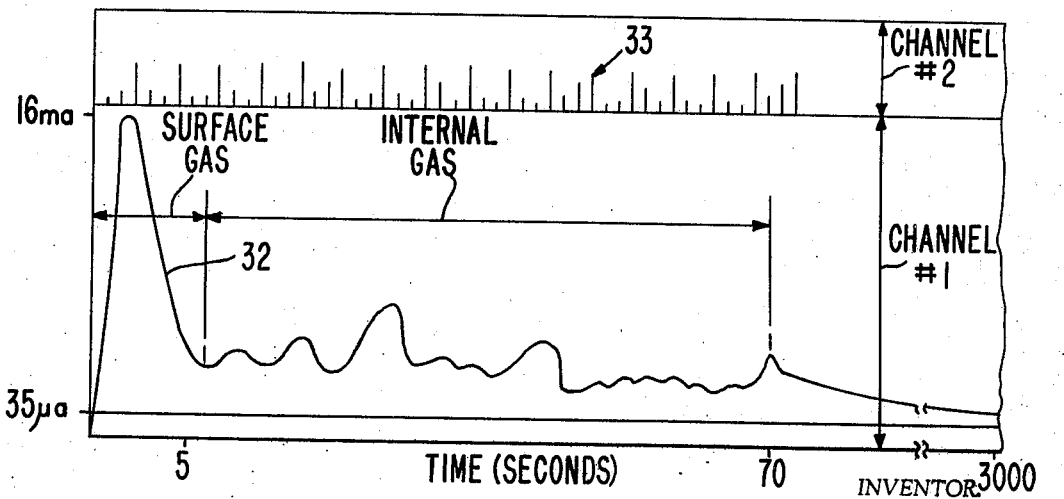
FIG. 2 is an example of the recording obtained from the recorder in the system of FIG. 1.

Referring now to FIG. 2, there is shown a typical recording obtained from recorder 31 in the apparatus of FIG. 1. After the fusion chamber 5 has been thoroughly outgassed and pumped by pump 9 to $10^{-8}$ torr or lower base pressure, the recorded pump's current is about 35 microamps. This represents the gas background level. When the sample 1 is dropped into the pool of molten metal, there is an initial gas burst which represents the evolution of the gases and vaporization of materials, such as water vapor, etc., which are adsorbed on the surface of the sample 1. For a sample of purified oxygen free copper, the initial gas burst goes to about 16 milliamps of pump current and the gas burst is pumped in about 5 seconds for a 5 gram sample 1. The recorded mass spectrums, at 33, typically show the gases evolved to be those ordinarily associated with adsorbed surface gases.

In the interval from 5 seconds to between 60 and 80 seconds, the internally dissolved gases are evolved from the sample 1 as the sample melts and dissolves into the pool of molten metal. After the 60 to 80 second period, the oxygen and oxides within the sample are converted to carbon monoxide and carbon dioxide which is evolved at an exponentially decaying rate out to about 500 to 3000 seconds.

The current curve 32 may be integrated to obtain a measure of the total gas content of the sample. In addition, the surface gas portion of the curve may be integrated separately to separate the amount of surface gases from internal gases. The amounts of the various constituent gases can be obtained by plotting the relative amounts of the various constituents on the recording as obtained from the mass spectrometer channel and integrating these curves separately to obtain the amounts of the constituents.

As a result, the vacuum fusion analyzer of FIG. 1 permits repeatable, precise measurements of gases in metals down to percentages as small as 1/10 of a part per million. Moreover, the measurements permit precise separation of surface gases from internally dissolved gases.

Referring now to FIG. 3, there is shown an alternative apparatus for measuring the rate at which gas is evolved from the sample 1. More particularly, a constriction 41 of known conductance is placed in the exhaust tubulation 21. A diffusion pump 42 of the type for pumping at a predetermined pumping speed is connected to pump gas from the fusion chamber through the constriction 41. A pressure measuring ion-gauge 43 is connected to the tubulation 21 downstream of the constriction 41. The ion current from the ion-gauge 43 is fed to the first channel of the recorder 31. This yields a measure of the gas evolved (pumped) because:

Conductance is 1/sec.

Pressure is in torr $$\therefore \frac{\text{(Conductance)}}{\text{(of orifice)}} \times \frac{\text{(Pressure)}}{\text{(Gauge)}} = 1/\text{sec.} \times \text{torr} = \frac{\text{torr} \times 1}{\text{sec.}}$$

then intergrating overtime $$\text{gas pumped} = \int \frac{\text{torr} \times 1}{\text{sec.}} dt = \text{torr} \times 1$$

Referring now to FIG. 4, there is shown an alternative vacuum fusion analyzer. This system is similar to that of FIG. 1 except that after the fusion chamber 5 has been pumped and outgassed and valved off, it is not pumped during melting of the sample 1. Instead, the chamber 5 is closed off during melting of the sample 1. Thus, all the gas evolved from the sample 1 is collected inside the fusion chamber 5 at whatever pressure it rises to due to evolution of gas from the sample 1. After all the gas has evolved from the sample 1, an inert carrier gas, such as He, is introduced from a source 45 via valve 46 into the fusion chamber 5 until the chamber reaches a pressure of approximately 1000 torr. Then the carrier gas supply 45 is valved off and valve 24 is opened to exhaust the mixture of sample gas and carrier gas into a gas chromatograph 47. The gas chromatograph separates and quantitatively measures the amounts of the various different gases which were evolved from the sample 1. The gas output peaks of the gas chromatograph are time displaced. If some of the gas peak outputs of the gas chromatograph 47 are desired to be further identified, they are fed in the carrier gas stream to a dual stage membrane type gas separator 48 which separates the carrier gas from the constituent gases and feds the constituent gases to a mass spectrometer 49 for mass analysis. The output of the gas chromatograph 47 gives the amount and type of gas evolved from the sample 1 but does not separate the surface gases from the dissolved gases.

An alternative temperature regulator system is employed in the embodiment of FIG. 4 for regulating the temperature of the walls 4 of the fusion chamber 5. In this embodiment, the coolant packet 12 is fed with preheated water obtained from a hot or cold water tap 51 and preheated by preheater 53 to a temperature above 40° C. and preferably about 10° C. less than the temperature to which the chamber walls 4 are to be held. The coolant such as water or other fluid picks up heat from the chamber walls 4 and is exhausted via outlet 54. As in previous temperature regulator, the walls 4 are regulated to a temperature within the range of 50° C. to 250° C. and preferably at 100° C.

What is claimed is:

1. In a vacuum fusion analyzer, an evacuable envelope structure having a portion defining a fusion chamber therewithin, means within said fusion chamber for fusing a metallic sample disposed therein, means for measuring the gases evolved from the sample, means for regulating the temperature of said evacuable structure portion which defines said fusion chamber to temperatures within the range of 50° C. to 250° C. while the sample is being fused whereby gases evolved from the sample are not appreciably retained as adsorbed gases on the walls of said fusion chamber, said means for measuring the gases evolved including a getter-ion vacuum pump to which said gases are directed and whose current is a measure of the rate at which gases are evolved, and means for passing a liquid coolant through a structure in heat exchanging relation with the cathode of said getter-ion pump.

2. The apparatus of claim 1 wherein said means for regulating the temperature of said evacuable envelope includes a cooling jacket surrounding said envelope and containing a liquid colant to be boiled at atmospheric pressure within said jacket by heat transferred from the walls of said evacuable envelope to the liquid coolant.

3. The apparatus of claim 2 wherein said temperature regulating means includes a condenser for condensing the evaporated coolant, and means for returning condensed liquid coolant to said cooling jacket.

4. The apparatus of claim 2 wherein said coolant within said jacket is water.

5. The apparatus of claim 1, wherein said means for fusing the sample includes means for providing a molten pool of metal into which the sample is plunged, whereby surface gases are evolved before dissolved gases such that the surface gases can be measured separately from the dissolved gases.

6. The apparatus of claim 5 wherein said means for measuring the evolved gases includes a mass spectrometer for repetitively measuring the types and relative amounts of the evolved gases as they are being evolved.

7. The apparatus of claim 6 including, means for recording the measured rate of gas evolution from the sample and the types and relative amounts of the evolved gases on a recording medium with the same time base, whereby the measurements of total rate, type of gas and relative amounts of gas are all correlated on the same time base.

8. In a vacuum fusion analyzer, an evacuable envelope structure having a portion defining a fusion chamber therewithin, means within said fusion chamber for fusing a metallic sample disposed therein, means for measuring the gases evolved from the sample, the improvement comprising, means for regulating the temperature of said evacuable structure portion which defines said fusion chamber to temperatures within the range of 50° C. to 250° C. while the sample is being fused whereby gases evolved from the sample are not appreciably retained as adsorbed gases on the walls of said fusion chamber, said temperature regulating means comprising a liquid coolant jacket disposed in heat exchanging relation with said envelope portion which defines the walls of said fusion chamber, and means for preheating the liquid coolant which is passed through said jacket to a predetermined temperature above about 40° C.

9. The apparatus of claim 8 including means for capturing the evolved gases in the diffusion chamber, means for filling said diffusion chamber with an inert permanent gas to a presure of one atmosphere after melting and outgassing of the sample to mix the carrier gas with the evolved sample gases, and a gas chromatograph to which the mixed gases are fed to measure the types and relative amounts of evolved gases.

10. In a vacuum fusion analyzer, evacuable envelope structure having a portion defining a fusion chamber therewithin, means within said fusion chamber for fusing a metallic sample disposed therein, means for measuring the gases evolved from the sample, means for regulating the temperature of said evacuable structure portion which defines said fusion chamber to temperatures within the range of 50° C. to 250° C. while the sample is being fused whereby gases evolved from the sample are not appreciably retained as adsorbed gases of the walls of said fusion chamber, said means for fusing the sample including means for providing a molten pool of metal into which the sample is plunged whereby surface gases are evolved before dissolved gases such that the surface gases can be measured separately from the dissolved gases, and said means for measuring the gases evolved from said sample includes means for measuring the approximate rate at which gases are evolved from the sample comprising a constricted orifice of predetermined size for passage of said gases, a pump downstream of said constricted orifice for pumping at a predetermined pumping speed gas evolved from said sample through said orifice, and an ionization pressure gauge downstream of said orifice for measuring the pressure of said evolved gas downstream of said orifice.

References Cited

UNITED STATES PATENTS

| | | | |
|---|---|---|---|
| 2,044,806 | 6/1936 | Naiman | 73—211 |
| 3,035,419 | 5/1962 | Wigert | 62—119 |
| 3,068,402 | 12/1962 | Redhead | 324—33 |
| 3,343,780 | 9/1967 | Hayward | 324—33 |

OTHER REFERENCES

Determination of Gases in Metals, 1960, containing the following papers: Oxygen in Metals, a review, W. T. Elwell, Gases in Metal by Vacuum Fusion, J. E. Still.

JAMES J. GILL, Primary Examiner

E. J. GILL, Assistant Examiner

U.S. Cl. X.R.

324—33